(12) United States Patent
Chi et al.

(10) Patent No.: US 8,901,864 B2
(45) Date of Patent: Dec. 2, 2014

(54) DRIVER HAVING DEAD-TIME COMPENSATION FUNCTION

(75) Inventors: Chien-Yu Chi, Taoyuan Hsien (TW); Chien-Ping Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 42 days.

(21) Appl. No.: 13/589,936

(22) Filed: Aug. 20, 2012

(65) Prior Publication Data

US 2013/0063059 A1 Mar. 14, 2013

(30) Foreign Application Priority Data

Sep. 9, 2011 (TW) .............................. 100132653 A (51) Int. Cl.
*H03K 5/00* (2006.01)
*H02P 27/08* (2006.01)
*H02M 1/38* (2007.01)

(52) U.S. Cl.
CPC ......... *H02P 27/08* (2013.01); *H02M 2001/385* (2013.01)
USPC .................... 318/400.13; 318/400.1; 318/142; 318/283; 318/285; 318/364

(58) Field of Classification Search
USPC ......... 318/400.13, 400.1, 142, 283, 285, 364, 318/445, 484
See application file for complete search history.

(56) References Cited

U.S. PATENT DOCUMENTS

| 5,488,269 A | * | 1/1996 | El-Hamamsy et al. | ....... 315/307 |
| 2008/0106919 A1 | * | 5/2008 | Shin et al. | ....... 363/131 |
| 2008/0298103 A1 | * | 12/2008 | Bendre et al. | ....... 363/89 |

FOREIGN PATENT DOCUMENTS

KR 20110015882 2/2011

* cited by examiner

*Primary Examiner* — Eduardo Colon Santana
*Assistant Examiner* — Iftekhar Mustafa
(74) *Attorney, Agent, or Firm* — Kirton McConkie; Evan R. Witt (57) ABSTRACT

Proposed is a driver having dead-time compensation function. The driver having dead-time compensation function generates an output voltage according to a voltage command and a frequency command. The driver includes an inverter, an output current detector and a control unit. The inverter receives a DC voltage and operates with a pulse width modulation mode so that the driver outputs the output voltage and an output current. The output current detector detects the current value of the output current to generate a output current detecting signal. The control unit outputs a switching control signal to inverter according to the voltage command and the frequency command. The control unit corrects a reference command according to dead-time and the output current detecting signal related to the output current so that amplitude and waveform smoothness of the output voltage and the output current are compensated.

15 Claims, 7 Drawing Sheets

DRIVER HAVING DEAD-TIME COMPENSATION FUNCTION

FIELD OF THE INVENTION

The invention is related to a driver, and more particularly to a driver having a dead-time compensation function.

BACKGROUND OF THE INVENTION

The contemporary control technique of using an inverter to drive a motor and control the rotation speed of the motor at the same time is generally classified into scalar control or vector control. Although the scalar control has a poor performance in terms of speed dynamic response, speed ratio control, and the precision control, it has been widely employed in non-server applications as the control architecture of the scalar control is simple, easy, and convergent. The scalar control is also termed as V/f control, or a variable voltage variable frequency control (VVVF). Generally, the scalar control is an open-loop control scheme without the need of the feedback information about the rotation speed of the motor. The basic principle of the scalar control is that the frequency of the power outputted to the motor, i.e. the output frequency of the inverter, is adjusted according to the rotation speed command. As the magnetic flux of the motor is positively proportional to the voltage/frequency ratio of the motor, the output voltage of the inverter has to be adjusted to maintain the ratio of the voltage/frequency of the motor at a constant value, thereby sustaining the magnetic flux of the motor and controlling the rotation speed of the motor.

Although the voltage/frequency control scheme is easy to implement, the error of the output voltage of the inverter under the low frequency and light load condition will aggravate as the output voltage of the inverter is low and the voltage drop of the switches of the inverter is significant. Thus, the control performance of the motor under the low frequency and light load condition is poor. Also, as the power transistors the inverter have non-ideal characteristics such as turn-on delays and turn-off delays, the power transistors will not turn on or off immediately when the input commands are applied thereto. In order to prevent the two transistors on the same rectifier bridge arm to induce a short circuit when the two transistors are not thoroughly turned on or off, a time delay is required between the turn-on time and the turn-off time of the two transistors on the same inverter bridge arm. This time delay is termed as dead time or the time to prevent short circuit.

The AC induction motor generally uses the pulse-width modulation technique to change the amplitude and frequency of the output voltage in order to control the rotation speed of the motor. Due to the architecture of the power transistors, the dead time is necessary to prevent the power transistors from turning on simultaneously during the operation of the inverter. Nonetheless, the dead time may cause a difference between the actual output voltage and the voltage commands. More disadvantageously, the dead time would cause the waveform of the output current to be distorted. Thus, the rotation speed of the motor will be unsmoothed. Thus, it is generally required to carry out open-loop compensation to counterbalance the negative effect as a result of dead time.

Figure 1A:
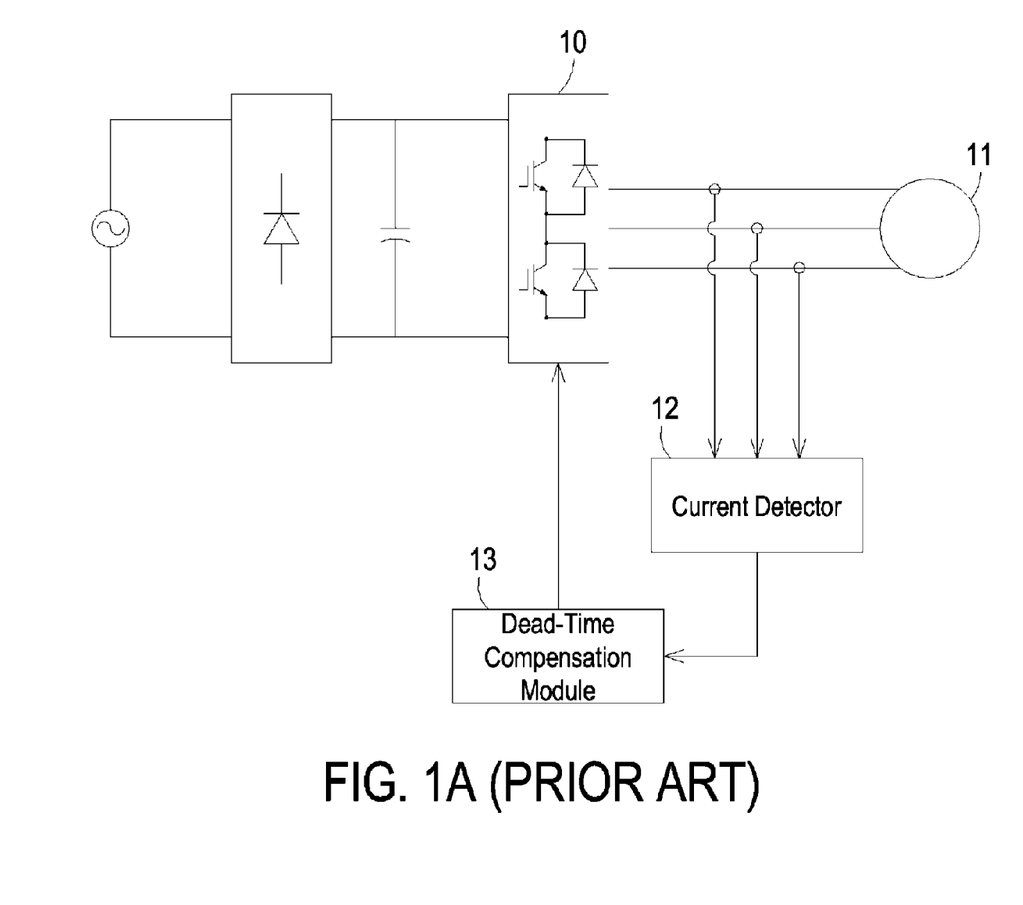
FIG. 1A shows the circuit block diagram for performing dead-time compensation in the inverter according to the prior art.

FIG. 1A shows the circuit block diagram for performing dead-time compensation in the inverter according to the prior art, which is by far the most common dead-time compensation scheme. As shown, the dead-time compensation scheme for the inverter 10 is accomplished by detecting the three-phase current of a motor 11 to calculate the required dead-time compensation quantity. That is, a current detector 12 is used to detect the input current of the motor 11, i.e. the current detector 12 is used to detect the three-phase output current of the inverter 10. The three-phase output current of the inverter 10 is received by a dead-time compensation module 13. According to the polarity of the three-phase output current, a pulse-width modulation (PWM) voltage command adds or subtracts an offset voltage to produce a trapezoid compensation curve in phase with the output current. Such dead-time compensation scheme is advantageous in terms of simple calculations. However, such dead-time compensation scheme has the advantage that the voltage compensation quantity and the slope of the trapezoid compensation curve will be deviant from the ideal value, which would in turn distort the output current waveform. Hence, the rotation speed of the motor will be discontinuous. Such distortion will be more obvious under the low-frequency and light load condition.

Figure 1B:
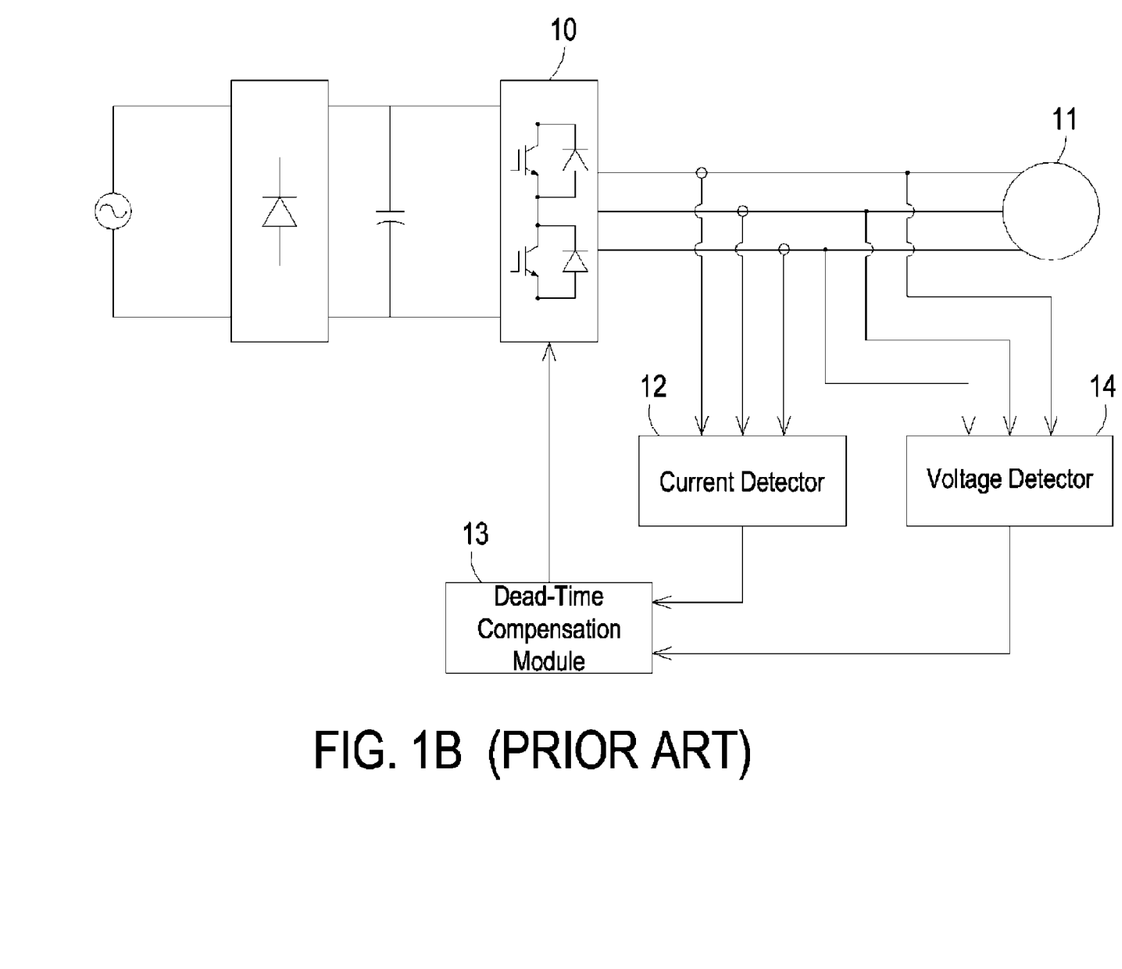
FIG. 1B shows another kind of the circuit block diagram for performing dead-time compensation in the inverter according to the prior art.

In order to address the aforementioned problem of the distorted current waveform of the output current induced when the motor is operating under the low frequency and light load condition, another dead-time compensation scheme has been proposed. FIG. 1B shows another kind of the circuit block diagram for performing dead-time compensation in the inverter according to the prior art. The dead-time compensation scheme shown in FIG. 1B is accomplished by way of voltage feedback. Compared to FIG. 1A, the circuitry of FIG. 1B additionally includes a voltage detector 14. The voltage detector 14 is used to detect the three-phase output voltage of the inverter 10 and obtain the instantaneous output voltage drop. The instantaneous output voltage drop and the polarity of the detected three-phase current are used to calculate the voltage compensation quantity and direction. By using such dead-time compensation scheme, the waveform of the output current is a smooth compensated curve being approximate to a sinusoidal wave. As discussed above, the compensation curve of the dead-time compensation scheme of FIG. 1A is a trapezoid. By using such dead-time compensation scheme of FIG. 1A, the current waveform will be seriously distorted under a high output voltage condition, and the voltage compensation quantity will be too much as the compensation quantity of the trapezoid compensation curve is inconsistent with the actual compensation quantity. By using such dead-time compensation scheme of FIG. 1B, a compensation quantity with high accuracy and an undistorted sinusoidal current are obtained, thereby suppressing the distortion of the output current waveform induced when the motor is operating under the low frequency and light load condition. However, as the dead-time compensation scheme of FIG. 1B requires an additional voltage detector 14, the cost of hardware circuitry is elevated.

In summary, the conventional dead-time compensation schemes uses the feature that the output voltage is different from the actual voltage command to counterbalance the negative effect of the dead time, thereby smoothing the waveform of the output current to allow the waveform of the output current to be approximate to a sinusoidal wave. However, these conventional dead-time compensation schemes will cause the voltage compensation quantity and the slope of the trapezoid compensation curve to deviate from the ideal value. Thus, the waveform of the output current is distorted. In this manner, the rotation speed of the motor will be non-uniform, which means that the rotation speed of the motor will alternate between slow and fast. The cost of hardware circuitry of the inverter will increase accordingly.

It is needed to develop a driver having dead-time compensation function with low cost and excellent insusceptibility to frequency fluctuation. The invention can meet these needs.

SUMMARY OF THE INVENTION

An object of the invention is to provide a driver having dead-time compensation function for compensating the negative effects caused by dead-time by way of the direct feedback of the output current. Thus, the waveform of the output current is approximate to the sinusoidal wave and the frequency of the output current is synchronous with the frequency indicated in the frequency command. In this manner, the manufacturing cost of the inverter is reduced and the driver is applicable to various motors.

To this end, a broad aspect of the invention is to provide a driver having dead-time compensation function for outputting an output voltage according to a voltage command and a frequency command to drive a load. The inventive driver includes an inverter operating with a pulse-width modulation mode for receiving a DC voltage to output the output voltage and an output current to the load; an output current detector connected to a current loop of the output current for detecting the output current and outputting an output current detecting signal accordingly; and a control unit connected to the inverter and the output current detector for outputting a switching control signal with a dead time to the inverter according to the voltage command and the frequency command, thereby driving the inverter to operate with the pulse-width modulation mode. The control unit is configured to correct a reference command which is varied along with the voltage command and the frequency command according to the output current detecting signal and the dead time, thereby compensating the output voltage, the amplitude and the smoothness of a waveform of the output current.

Now the foregoing and other features and advantages of the invention will be best understood through the following descriptions with reference to the accompanying drawings, in which:

DESCRIPTION OF THE PREFERRED EMBODIMENT

An exemplary embodiment embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 2A:
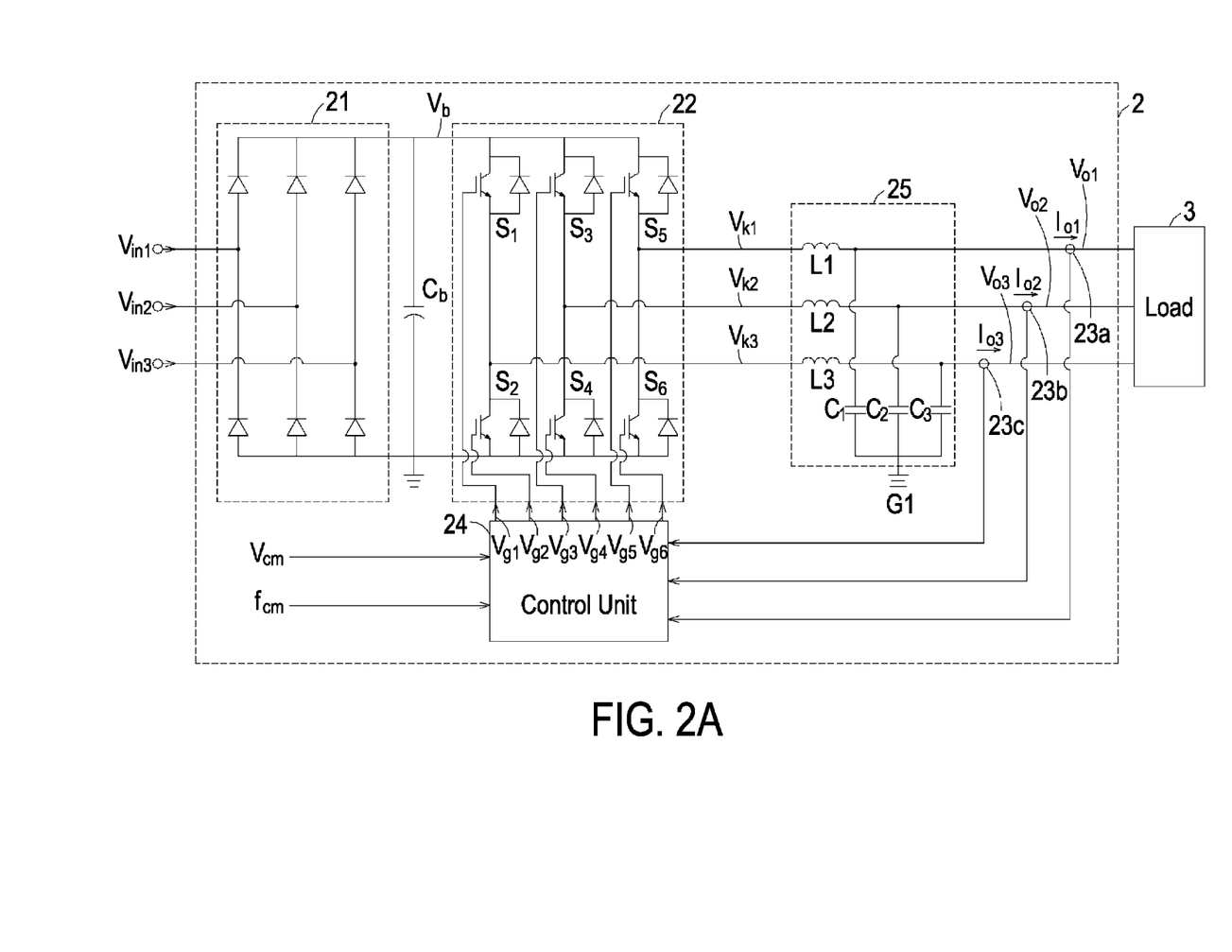
FIG. 2A shows the circuitry of the driver having dead-time compensation function according to an exemplary embodiment of the invention.
Figure 2B:
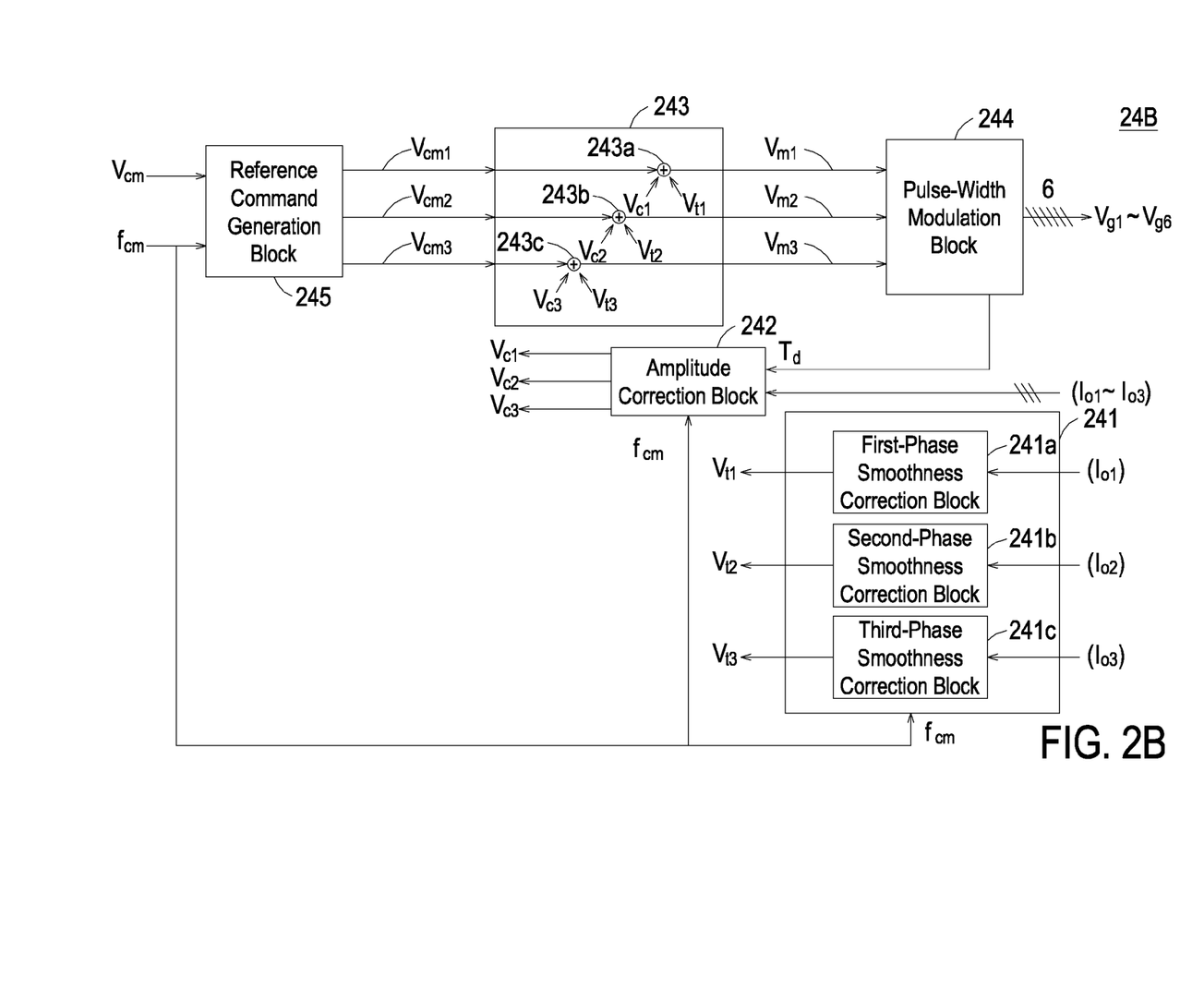
FIG. 2B shows the block diagram of the control block within the control unit according to the exemplary embodiment of the invention.

Referring to FIG. 2A and FIG. 2B, in which FIG. 2A shows the circuitry of the driver having dead-time compensation function according to an exemplary embodiment of the invention, and FIG. 2B shows the block diagram of the control blocks within the control unit according to the exemplary embodiment of the invention. As shown in FIG. 2A, the driver 2 having dead-time compensation function according to the invention is used to receive a single-phase or a three-phase input voltage $V_{in1}$-$V_{in3}$ from a power supply system (not shown) at its input side, and the output side of the driver 2 is connected to the load 3. The load 3 may be a motor. In operation, the driver 2 will convert the input voltage $V_{in}$ into a single-phase or a three-phase output voltage $V_{o1}$-$V_{o3}$ having a voltage value identical to the voltage command $V_{cm}$ and a frequency value identical to the frequency command $f_{cm}$ according to the voltage command $V_{cm}$ and the frequency command $f_{cm}$, thereby driving the motor to operate. Therefore, the rotation speed of the motor is varied along with the voltage command $V_{cm}$ and the frequency command $f_{cm}$ to achieve the control of the rotation speed. The voltage command $V_{cm}$ and the frequency command $f_{cm}$ may be generated by a control panel (not shown). The user may input the desired rotation speed of the motor (such as 500 rpm) through the control panel, and the control panel may generate the voltage command $V_{cm}$ and the frequency command $f_{cm}$ according to the desired rotation speed of the motor.

In this embodiment, the driver 2 having dead-time compensation function according to the invention includes a rectifier 21, an inverter 22, output current detectors 23a-23c, a control unit 24, a filter 25, and a bus capacitor $C_b$. The DC side of the rectifier 21 is connected to the bus capacitor $C_b$ and the inverter 22 for rectifying the input voltage $V_{in1}$-$V_{in3}$ to generate a DC voltage $V_b$ (the bus voltage). The DC voltage $V_b$ (the bus voltage) is outputted to the bus capacitor $C_b$ and the inverter 22. The bus capacitor $C_b$ is connected to the DC side of the rectifier 21 and the power input side of the inverter 22 for suppressing the high-frequency noise of the DC voltage $V_b$.

In this embodiment, the power input side of the inverter 22 is connected to the bus capacitor $C_b$ and the DC side of the rectifier 21. The power output side of the inverter 22 is connected to the input side of the filter 25 for converting the DC voltage $V_b$ into a single-phase or a three-phase modulating voltage $V_{k1}$-$V_{k3}$ by way of pulse-width modulation (PWM). In this embodiment, the inverter 22 may be a voltage source inverter (VSI), and is used to convert the DC voltage $V_b$ into a single-phase or a three-phase modulating voltage $V_{k1}$-$V_{k3}$ by way of space vector pulse-width modulation (SVPWM) or sinusoidal pulse-width modulation (SPWM).

In this embodiment, the input side of the filter 25 is connected to the power output side of the inverter 22. The output side of the filter 25 is connected to the load 3 through the output side of the driver 2. The filter 25 is used to remove the high-frequency components of the single-phase or the three-phase modulating voltage $V_{k1}$-$V_{k3}$. For example, the filter 25 may be used to remove the components with a high modulating frequency of 15 kHz in the single-phase or the three-phase modulating voltage $V_{k1}$-$V_{k3}$. In this way, a single-phase or a three-phase output voltage $V_{o1}$-$V_{o3}$ having a voltage value identical to the voltage command $V_{cm}$ (e.g. 380V) and a frequency value identical to the frequency command $f_{cm}$ (e.g. 60 Hz) is outputted to the output side of the driver 2.

In this embodiment, the three-phase output current detectors 23a-23c are respectively connected to the current loop of the three-phase currents $I_{o1}$-$I_{o3}$. For example, the three-phase output current detectors 23a-23c are connected to the output side of the driver 2. The three-phase output current detectors $23a$-$23c$ may be implemented by one or more current transformers. The three-phase output current detectors $23a$-$23c$ are configured to detect the current values of the three-phase currents $I_{o1}$-$I_{o3}$ and generate three-phase output current detecting signals. It should be noted that the three-phase currents $I_{o1}$-$I_{o3}$ and the three-phase output current detecting signals have similar waveforms, but have different magnitudes.

In this embodiment, the control unit 24 is connected to the control side of the inverter 22 and the detecting side of the three-phase output current detectors $23a$-$23c$, and may be implemented by a digital signal processor (DSP) or a pulse-width modulation (PWM) controller. The control unit 24 is used to generate switching control signals $V_{g1}$-$V_{g6}$ having a dead time Td according to the voltage command $V_{cm}$ and the frequency command $f_{cm}$ and output the switching control signals $V_{g1}$-$V_{g6}$ to the inverter 22, thereby driving the inverter 22 to convert the DC voltage $Y_b$ into a single-phase or a three-phase modulating voltage $V_{k1}$~$V_{k3}$ by way of pulse-width modulation. The voltage value and the frequency value of the output voltage $V_{o1}$~$V_{o3}$ are respectively identical to the voltage command $V_{cm}$ and the frequency command $f_{cm}$. Moreover, according to the output current detecting signal of the output currents $I_{o1}$-$I_{o3}$ and the dead time Td, the control unit 24 can correct at least one phase of the three-phase reference command $V_{cm1}$-$V_{cm3}$ which is varied along with the voltage command $V_{cm}$ and the frequency command $f_{cm}$, thereby compensating the amplitude of the output voltage $V_{o1}$-$V_{o3}$, the amplitude of the output current $I_{o1}$-$I_{o3}$, and the smoothness of the waveform of the $I_{o1}$-$I_{o3}$.

In this embodiment, the inverter 22 includes switch elements $S_1$-$S_6$. The switch elements $S_1$-$S_6$ are configured to turn on and off in response to the state (an enabling state with a high voltage level or a disabling state with a low voltage level) of the switching control signals $V_{g1}$-$V_{g6}$ generated by the control unit 24. Thus, the energy of the DC voltage $Y_b$ can be selectively transmitted to the input side of the filter 25 through the switch elements $S_1$-$S_5$ or/and the sixth switch element $S_6$, thereby outputting a three-phase modulating voltage $V_{k1}$-$V_{k3}$ to the input side of the filter 25. The control terminals of the switch elements $S_1$-$S_6$ are connected to the control unit 24, and the switch elements $S_1$-$S_6$ are serially interconnected in pairs to constitute three switch pairs. The switch pairs are connected in parallel with each other at the DC side of the rectifier 21 and across the bus capacitor $C_b$. In operation, the switch pairs are turned on and off in response to the switching control signals $V_{g1}$-$V_{g6}$ generated by the control unit 24, thereby selectively transmitting the energy of the DC voltage $Y_b$ to the filter 25 through the switch pairs. Also, in this embodiment the inverter 22 further includes six body diodes respectively connected in parallel across a corresponding switch element for protecting the switch element $S_1$-$S_6$ when the switch element $S_1$-$S_6$ are turned off.

In this embodiment, the switch elements $S_1$-$S_6$ may be implemented by thyristor switch elements, such as bipolar junction transistors (BJTs), metal-oxide-semiconductor field-effect transistors (MOSFETs), insulated gate bipolar transistors (IGBTs), silicon-controlled rectifiers (SCRs), or triode AC switches (TRIACs).

In this embodiment, the filter 25 which is consisted of high-power passive elements includes inductors $L_1$-$L_3$ and capacitors $C_1$-$C_3$. The inductors $L_1$-$L_3$ may be connected between the power output side of the inverter 22 and the output side of the driver 2. The capacitors $C_1$-$C_3$ may be connected to the output side of the driver and the ground terminal G1 in a Y-configuration.

As shown in FIG. 2B, the inventive driver 2 having dead-time compensation function is configured to compensate the dead time Td during the operation of the driver 2 by way of an open-loop compensation scheme. That is, the driver 2 does not perform closed-loop control by way of the feedback of the output currents $I_{o1}$-$I_{o3}$ to the control loop of the main control block. The control block 24B of the control unit 24 includes a smoothness correction block 241, an amplitude correction block 242, a summation block 243, a pulse-width modulation block 244, and a reference command generation block 245. The smoothness correction block 241, the amplitude correction block 242, and the summation block 243 are used to counterbalance the negative effect of the dead time td.

As the voltage command $V_{cm}$ and the frequency command $f_{cm}$ are scalar values, the reference command generation block 245 needs the voltage value indicated by the voltage command $V_{cm}$ and the frequency value indicated by the frequency command $f_{cm}$ to generate at least one phase of the three-phase reference command $V_{cm1}$~$V_{cm3}$ which is varied in a sinusoidal manner. In this embodiment, the driver 2 is a three-phase driver and is used to drive a three-phase motor. According to the voltage command $V_{cm}$ and the frequency command $f_{cm}$, the reference command generation block 245 generates a three-phase reference command $V_{cm1}$~$V_{cm3}$ with a phase difference of 120 degree. When the driver 2 is a single-phase driver and is used to drive a single-phase motor, the smoothness correction block 241, the amplitude correction block 242, the summation block 243, and the reference command generation block 245 will only generate a first-phase waveform correction signal $V_{t1}$, a first-phase amplitude correction signal $V_{c1}$, a first-phase secondary reference command $V_{m1}$, and a first-phase reference command $V_{cm1}$, and the driver 2 only generates and outputs a first-phase output voltage $V_{o1}$ and a first-phase output current $I_{o1}$ for the motor.

Based on the frequency value indicated by the frequency command $f_{cm}$, the smoothness correction block 241 can analyze the smoothness of the output currents $I_{o1}$-$I_{o3}$ by the output current detecting signals of the output currents $I_{o1}$-$I_{o3}$. The smoothness correction block 241 can be implemented by an error-driven controller, such as a proportional-integral-derivative controller (PID controller), a proportional-integral controller (PI controller), a proportional controller (P controller), or a proportional-derivative controller (PD controller). The smoothness correction block 241 is used to generate a single-phase or a three-phase waveform correction signal $V_{t1}$-$V_{t3}$. In this embodiment, the driver 2 is a three-phase driver for driving a three-phase motor. Hence, the smoothness correction block 241 is consisted of a 241a, a second-phase smoothness correction block 241b, and a third-phase smoothness correction block 241c. Based on the frequency value indicated by the frequency command $f_{cm}$, the first-phase smoothness correction block 241a, the second-phase smoothness correction block 241b, and the third-phase smoothness correction block 241c can analyze the smoothness of the output currents $I_{o1}$-$I_{o3}$ in a phase-by-phase manner by the output current detecting signals of the output currents $I_{o1}$-$I_{o3}$, and generate waveform correction signals $V_{t1}$-$V_{t3}$ respectively.

The amplitude correction block 242 is used to generate a single-phase or a three-phase amplitude correction signal $V_{c1}$-$V_{c3}$ according to the duration of the dead time Td. The amplitude of the rectangular wave of the three-phase amplitude correction signal $V_{c1}$-$V_{c3}$ is positively proportional to the duration of the dead time Td, and the frequency of the three-phase amplitude correction signal $V_{c1}$-$V_{c3}$ is identical to the frequency command $f_{cm}$. In this embodiment, the amplitude correction block 242 can generate a three-phase amplitude correction signal $V_{c1}$-$V_{c3}$, in which each phase of the correction signal $V_{c1}$-$V_{c3}$ are separated from each other with a phase difference of 120 degree. Also, each phase of the three-phase amplitude correction signal $V_{c1}$-$V_{c3}$ is synchronous with the corresponding phase of the three-phase output current $I_{o1}$-$I_{o3}$ by way of the output current detecting signals of the output currents $I_{o1}$-$I_{o3}$.

The summation block 243 is used to receive the single-phase or three-phase reference command $V_{cm1}$-$V_{cm3}$, the waveform correction signal $V_{t1}$-$V_{t3}$, and the amplitude correction signal $V_{c1}$-$V_{c3}$, and superpose the single-phase or three-phase reference command $V_{cm1}$-$V_{cm3}$, the waveform correction signal $V_{t1}$-$V_{t3}$, and the amplitude correction signal $V_{c1}$-$V_{c3}$ for correcting or compensating the single-phase or three-phase reference command $V_{cm1}$-$V_{cm3}$, thereby generating the single-phase or three-phase secondary reference command $V_{m1}$-$V_{m3}$. In this embodiment, the driver 2 is a three-phase driver for driving a three-phase motor. The summation block 243 includes a first-phase summation block 243a, a second-phase summation block 243b, and a third-phase summation block 243c. The first-phase summation block 243a, the second-phase summation block 243b, and the third-phase summation block 243c are used to superpose the three-phase reference command $V_{cm1}$-$V_{cm3}$, the waveform correction signal $V_{t1}$-$V_{t3}$, and the amplitude correction signal $V_{c1}$-$V_{c3}$, in a phase-by-phase manner in order to generate the three-phase secondary reference command $V_{m1}$-$V_{m3}$. That is, the three-phase reference command $V_{cm1}$-$V_{cm3}$ is added to the compensation quantity ($V_{t1}$~$V_{t3}$~$V_{c1}$~$V_{c3}$) to generate the three-phase secondary reference command $V_{m1}$-$V_{m3}$. The relationship between the secondary reference command, the reference command, the waveform correction signal, and the amplitude correction signal can be expressed by the following equations:

$$V_{m1}=V_{cm1}+V_{t1}+V_{c1},$$

$$V_{m2}=V_{cm2}+V_{t2}+V_{c2},$$

$$V_{m3}=V_{cm3}+V_{t3}+V_{c3}.$$

In operation, the pulse-width modulation block 244 is used to compare the secondary reference command $V_{m1}$-$V_{m3}$ with a triangular carrier wave (not shown) which is used for the purpose of modulation with a high modulation frequency. According to the results of the comparison, the switching control signal $V_{g1}$~$V_{g6}$ are generated. Unlike the conventional control block, the pulse-width modulation block 244 according to the invention does not use the reference command $V_{cm1}$-$V_{cm3}$ to generate the switching control signal $V_{g1}$~$V_{g6}$. Instead, the pulse-width modulation block 244 according to the invention uses the secondary reference command $V_{m1}$-$V_{m3}$ to generate the switching control signal $V_{g1}$~$V_{g6}$. Thus, the invention can correct or compensate the negative effects caused by the dead time Td which is needed when the pulse-width modulation block 244 is generating the switching control signal $V_{g1}$~$V_{g6}$. The negative effects caused by the dead time Td include the decrease of the amplitude of the output voltages $V_{o1}$-$V_{o3}$, the decrease of the amplitude of the output currents $I_{o1}$-$I_{o3}$, and the unsmoothed current waveforms.

Figure 3:
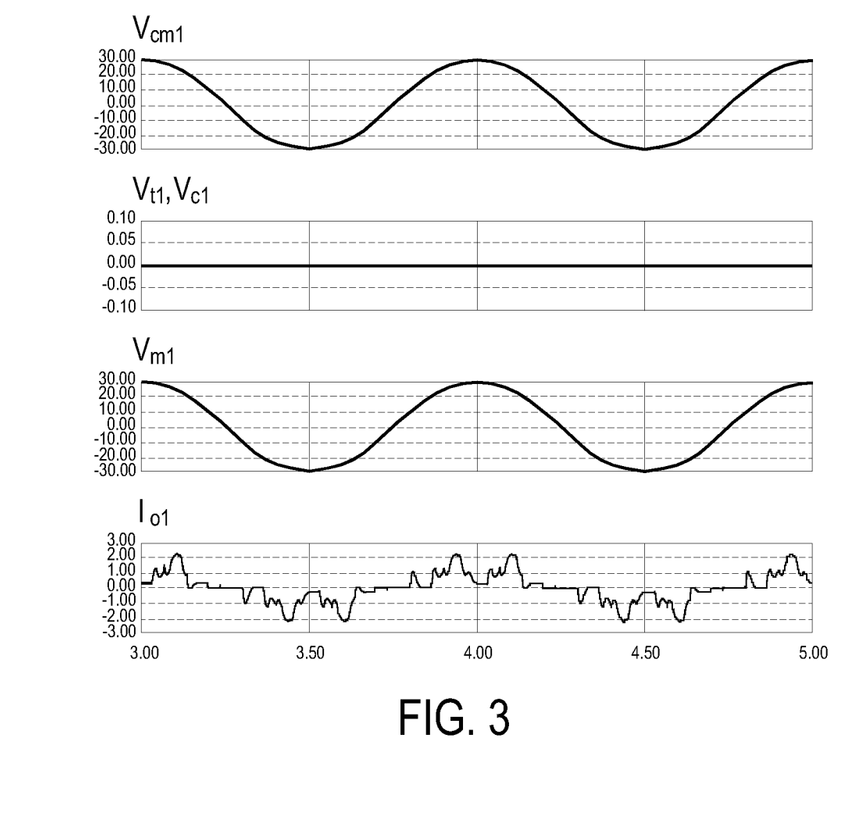
FIGS. 3-5 show the waveforms of one phase of the voltage command, the waveform correction signal, the amplitude correction signal, the secondary reference command, and the output current.
Figure 4:
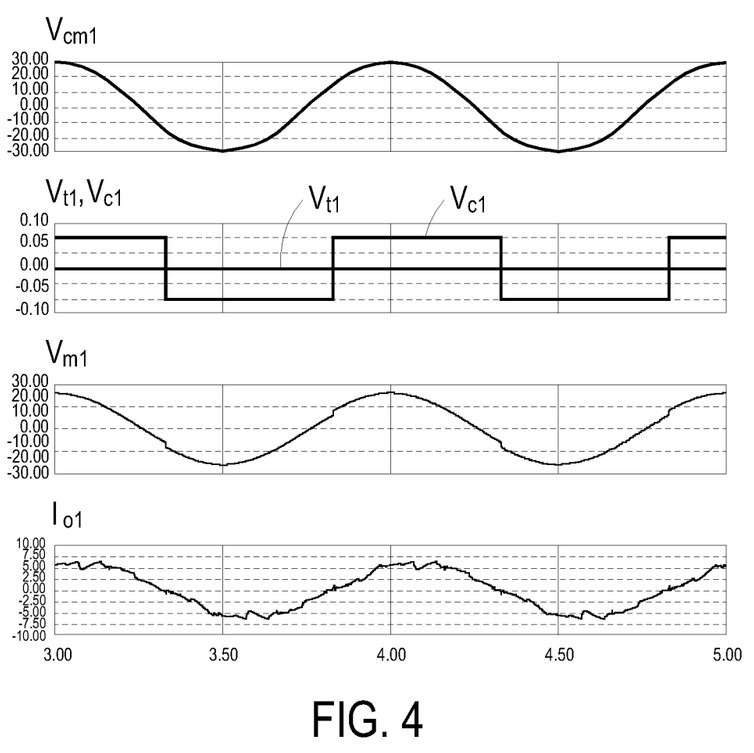
Figure 5:
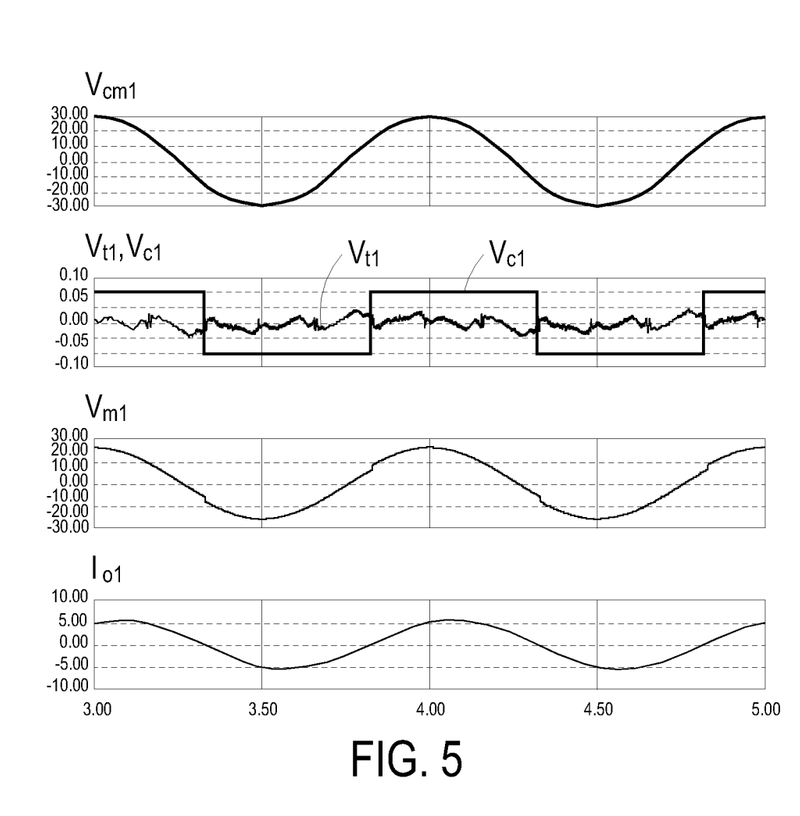

Next, the detailed operations of the driver 2 having dead-time compensation function according to the invention under different control modes will be described. Referring to FIGS. 3-5, in which FIGS. 3-5 show the waveforms of one phase of the voltage command, the waveform correction signal, the amplitude correction signal, the secondary reference command, and the output current. As each phase is separated from each other by a phase difference of 120 degree, the first phase is taken as an example for illustration. Referring to FIG. 3, the dead time Td of the inverter 22 is set to prevent the switch elements $S_1$-$S_6$ of the inverter 22 from turning on simultaneously. If the dead time Td is not compensated, i.e. if the operation of the smoothness correction block 241 and the operation of the amplitude correction block 242 are stopped and the first-phase waveform correction signal $V_{t1}$ and the first-phase amplitude correction signal $V_{c1}$ are zero accordingly, the dead time Td will cause difference between the actual first-phase output voltage $V_{o1}$ (not shown) and the first-phase reference command $V_{cm1}$. Furthermore, the dead time Td will cause the waveform of the first-phase output voltage $V_{o1}$ (not shown) and the waveform of the first-phase current $I_{o1}$ to be an unsmooth sinusoidal wave. The uncompensated first-phase output current $I_{o1}$ has a very low current value and a disorderly waveform.

Referring to FIG. 4, if the amplitude correction block 242 is operating but the smoothness correction block 241 is stopped from operating, i.e. when the first-phase waveform correction signal $V_{t1}$ is zero, the amplitude correction block 242 will generate the first-phase amplitude correction signal $V_{c1}$ which is a rectangular wave having an amplitude relative to the duration of the dead time Td. This first-phase amplitude correction signal $V_{c1}$ is used to compensate the amplitude of the first-phase output voltage $V_{o1}$. Thus, the current value (amplitude) of the first-phase output current $I_{o1}$ is elevated to an optimum value. Under this condition, the first-phase secondary reference command $V_{m1}$ is generated by superposing the first-phase reference command $V_{cm1}$ and the first-phase amplitude correction signal $V_{c1}$ ($V_{m1}=V_{cm1}+V_{c1}$).

When the smoothness correction block 241 and the amplitude correction block 242 are both operating, the smoothness correction block 241 can analyze the smoothness of the first-phase output current $I_{o1}$ by the output current detecting signals of the first-phase output currents $I_{o1}$ based on the frequency value indicated by the frequency command $f_{cm}$. Thus, the first-phase waveform correction signal $V_{t1}$ is generated accordingly. Under this condition, the waveform of the first-phase output voltage $V_{o1}$ and the waveform of the first-phase output current $I_{o1}$ are smoothed, as shown in FIG. 5. Afterwards, the first-phase amplitude correction signal $V_{c1}$ which has a small variation and the first-phase waveform correction signal $V_{t1}$ are superposed on the first-phase reference command $V_{cm1}$ to generate the first-phase secondary reference command $V_{m1}$ ($V_{m1}=V_{cm1}+V_{t1}+V_{c1}$). This first-phase secondary reference command $V_{m1}$ is provided for the pulse-width modulation block 244 so that the first-phase output voltage $V_{o1}$ (not shown) and the first-phase output current $I_{o1}$ have an enhanced amplitude and a smoother waveform (their waveforms are approximate to the sine function). Therefore, the secondary reference command $V_{m1}$-$V_{m3}$ which is generated by the summation block 243 by the superposition of the reference command $V_{cm1}$-$V_{cm3}$, the waveform correction signal $V_{t1}$-$V_{t3}$, and amplitude correction signal $V_{c1}$-$V_{c3}$ can protect the three-phase output voltage $V_{o1}$-$V_{o3}$ and the three-phase output current $I_{o1}$-$I_{o3}$ from the negative effects caused by the dead time. Hence, the motor can operate steadily and continuously. In addition, the invention uses the amplitude correction block to generate an amplitude correction signal which is a rectangular wave to counterbalance the negative effect caused by the dead time. More advantageously, the invention uses a smoothness correction block to analyze the smoothness of the output currents based on the frequency value indicated by the frequency command $f_{cm}$, thereby generating waveform correction signal to counterbalance the negative effect caused by the dead time. In this manner, the control performance of the driver will not be susceptible to the modulating frequency (carrier frequency) and will not degenerate as a result of the decrease of the modulating frequency. Hence, even if the motor is operating under an extremely low operating frequency (e.g. 0.05 Hz or below), i.e. even if the motor is operating under the condition that the frequency of the output voltage is extremely low, the motor can operate smoothly.

In conclusion, the inventive driver having dead-time compensation function can correct the amplitude and waveform of the output voltage and correct the amplitude and waveform of the output current by way of current feedback. The control blocks of the control unit can be implemented by a digital signal processor or the firmware of a pulse-width modulation controller. Thus, the cost of the hardware circuitry is saved. Also, the inventive driver having dead-time compensation function is irrelevant to the system parameters. Thus, the inventive driver having dead-time compensation function can be universally applied to various motors or drivers without the need of beforehand corrections or adjustments. Hence, the fine tuning of the driver will be easier.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A driver having a dead-time compensation function for outputting an output voltage according to a voltage command and a frequency command to drive a load, comprising:
    an inverter operating with a pulse-width modulation mode for receiving a DC voltage to output the output voltage and an output current to the load;
    an output current detector connected to a current loop of the output current for detecting the output current and outputting an output current detecting signal accordingly; and
    a control unit connected to the inverter and the output current detector for outputting a switching control signal with a dead time to the inverter according to the voltage command and the frequency command, thereby driving the inverter to operate with the pulse-width modulation mode;
    wherein the control unit is configured to correct a reference command which is varied along with the voltage command and the frequency command according to the output current detecting signal and the dead time, thereby compensating an amplitude of the output current, and a smoothness of a waveform of the output current;
    wherein the control unit includes a plurality of control blocks, comprising:
    a reference command generation block for generating the reference command according to a voltage value indicated by the voltage command and a frequency value indicated by the frequency command;
    a smoothness correction block for analyzing the smoothness of the waveform of the output current based on the frequency value indicated by the frequency command and generating a waveform correction signal accordingly;
    an amplitude correction block for generating an amplitude correction signal having an amplitude being varied along with the duration of the dead time and having a frequency being identical to the frequency value indicated by the frequency command;
    a summation block for adding the waveform correction signal and the amplitude correction signal into the reference command to generate a secondary reference command; and
    a pulse-width modulation block for generating the switching control signal according to the secondary reference command to compensate the output voltage, the amplitude of the output current, and the smoothness of the waveform of the output current.

2. The driver having a dead-time compensation function n according to claim 1 wherein the smoothness correction block is configured to analyze the smoothness of the waveform of the output current based on the frequency value indicated by the frequency command and generate the waveform correction signal by an error-driven controller.

3. The driver having a dead-time compensation function according to claim 2 wherein the error-driven controller is a proportional-integral-derivative controller, a proportional-integral controller, a proportional controller, or a proportional-derivative controller.

4. The driver having a dead-time compensation function according to claim 1 wherein the amplitude correction signal is a rectangular wave having an amplitude being positively proportional to the duration of the dead time.

5. The driver having a dead-time compensation function according to claim 1 wherein the driver is a three-phase driver and the reference command generation block is configured to generate the reference command according to the voltage command and the frequency command, and wherein the reference command is a three-phase reference command and each phase of the reference command is separated from each other by a phase difference of 120 degree.

6. The driver having a dead-time compensation function according to claim 5 wherein the each phase of the output current detector is connected to a corresponding phase of the current loop of the output current for detecting a current value of each phase of the output current and generating a waveform of each phase of the output current detecting signal.

7. The driver having a dead-time compensation function according to claim 6 wherein the output current detector is implemented by a current transformer or a plurality of current transformers.

8. The driver having a dead-time compensation function according to claim 6 wherein the smoothness correction block includes a first-phase smoothness correction block, a second-phase smoothness correction block, and a third-phase smoothness correction block for analyzing the smoothness of the waveform of each phase of the output current respectively based on the frequency value indicated by the frequency command and generating a waveform correction signal accordingly.

9. The driver having a dead-time compensation function according to claim 8 wherein the amplitude correction signal is a three-phase signal and each phase of the amplitude correction signal is separated from each other by a phase difference of 120 degree.

10. The driver having a dead-time compensation function according to claim 5 wherein the summation block includes a first-phase summation block, a second-phase summation block, and a third-phase summation block for superposing the reference command, the waveform correction signal, and the amplitude correction signal in a phase-by-phase manner to generate the secondary reference command.

11. The driver having a dead-time compensation function according to claim 1 wherein the control unit is implemented by a digital signal processor or a pulse-width modulation controller, and the control blocks of the control unit is implemented by the digital signal processor or a firmware of the pulse-width modulation controller.

12. The driver having a dead-time compensation function according to claim 1 further comprising:
    a rectifier connected to the inverter for rectifying an input voltage into the DC voltage; and
    a bus capacitor connected to the rectifier and the inverter for suppressing high-frequency noises of the DC voltage.

13. The driver having a dead-time compensation function according to claim 1 further comprising a filter connected to a power output side of the inverter and an output side of the driver for removing high-frequency components of a modulating voltage outputted by the inverter to generate the output voltage having a voltage value identical to the voltage command and a frequency value identical to the frequency command.

14. The driver having a dead-time compensation function according to claim 13 wherein the inverter includes a plurality of switch elements configured to turn on and off in response to a state of the switching control signal for selectively transmitting energy of the DC voltage to an input side of the filter through the switch elements, thereby generating the modulating voltage.

15. The driver having a dead-time compensation function according to claim 14 wherein the inverter further includes a plurality of diodes individually connected in parallel across a corresponding switch element for protecting the switch elements.

* * * * *